US011820468B2

(12) United States Patent
Nedwed et al.

(10) Patent No.: US 11,820,468 B2
(45) Date of Patent: Nov. 21, 2023

(54) UNMANNED SURFACE VEHICLES, SURVEY SYSTEMS, AND METHODS FOR USING THE SAME

(71) Applicant: ExxonMobil Technology and Engineering Company, Spring, TX (US)

(72) Inventors: Timothy J. Nedwed, Houston, TX (US); Douglas A. Mitchell, Spring, TX (US); Timothy A. Thornton, Tulsa, OK (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 723 days.

(21) Appl. No.: 17/017,747

(22) Filed: Sep. 11, 2020

(65) Prior Publication Data

US 2021/0101664 A1    Apr. 8, 2021

Related U.S. Application Data

(60) Provisional application No. 62/912,355, filed on Oct. 8, 2019.

(51) Int. Cl.
| | |
|---|---|
| *G01V 8/02* | (2006.01) |
| *B63B 35/32* | (2006.01) |
| *B64C 39/02* | (2023.01) |
| *H04W 4/40* | (2018.01) |
| *B63B 35/00* | (2020.01) |
| *B64U 101/30* | (2023.01) |

(52) U.S. Cl.
CPC ............ *B63B 35/32* (2013.01); *B64C 39/024* (2013.01); *H04W 4/40* (2018.02); *B63B 2035/008* (2013.01); *B63B 2213/02* (2013.01); *B64U 2101/30* (2023.01); *B64U 2201/202* (2023.01)

(58) Field of Classification Search
CPC ... C02F 2101/32; B64C 39/024; B64D 47/08; B64U 2101/20; B64U 50/13; B64U 2101/00; G01N 33/1833; G01N 33/241; G01N 2021/6417; G01N 33/1886; G01N 21/94; G01N 33/2823; G01V 9/007; B63B 2022/006; B63B 2035/008; B63B 21/66
See application file for complete search history.

(56) References Cited

U.S. PATENT DOCUMENTS 9,829,602 B2 * 11/2017 Bond ..................... G01V 9/007

* cited by examiner

*Primary Examiner* — Don K Wong
(74) *Attorney, Agent, or Firm* — ExxonMobil Technology and Engineering Company—Law Department

(57) ABSTRACT

A remote survey system includes an unmanned surface vehicle that includes a body, a propulsion system coupled to the body to provide mobility to the unmanned surface vehicle to traverse a surface of a waterbody, and a thickness detection assembly mounted to a hull of the body and including one or more thickness detection cameras. A central computer system is located at a command center and in wireless communication with the unmanned surface vehicle via a communication module. The one or more thickness detection cameras are positioned to obtain one or more images or videos of an air-oil-water interface on the surface of the waterbody, and a thickness of a released substance present on the surface of the waterbody is determined based on the one or more images or videos of the air-oil-water interface.

25 Claims, 3 Drawing Sheets

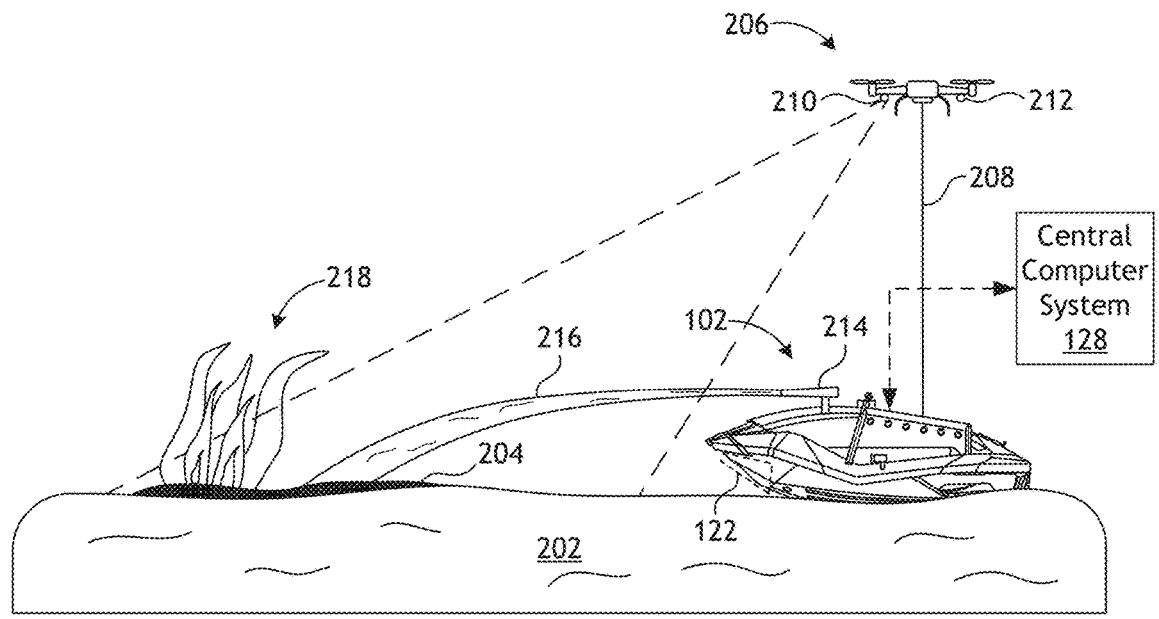
FIG. 2
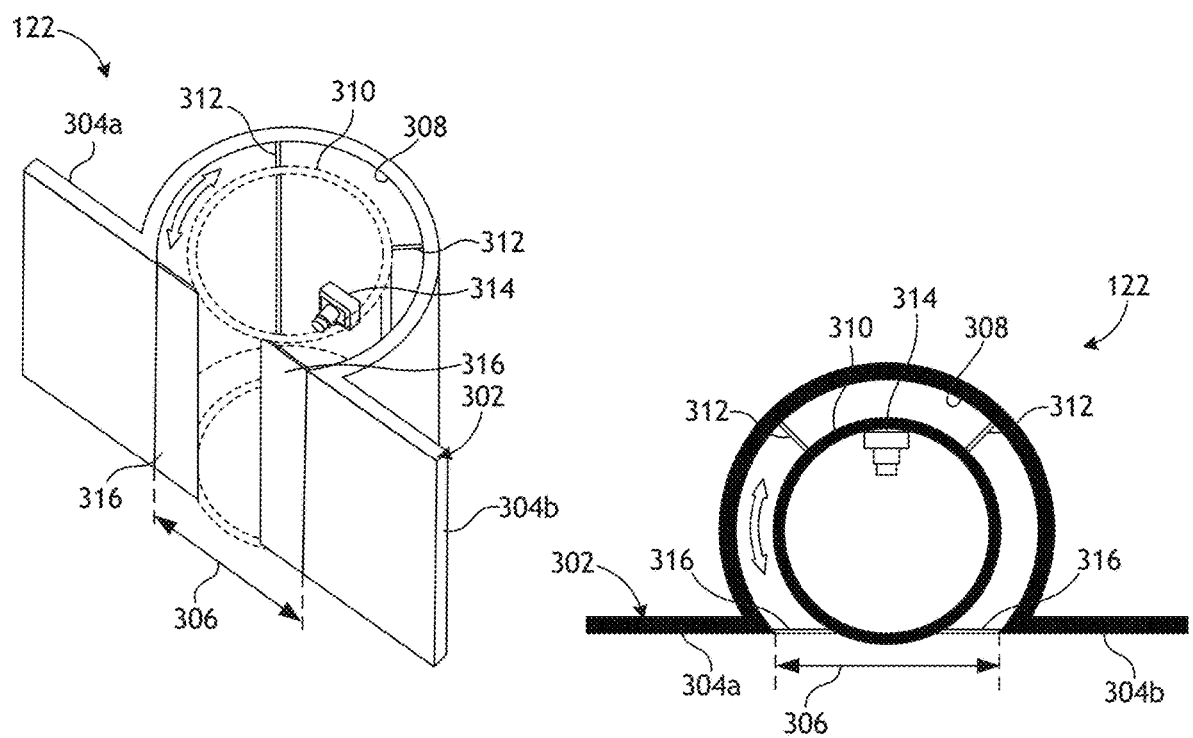
FIG. 3A                    FIG. 3B

UNMANNED SURFACE VEHICLES, SURVEY SYSTEMS, AND METHODS FOR USING THE SAME

CROSS REFERENCE TO RELATED APPLICATION

This application claims the benefit of U.S. Provisional Application No. 62/912,355 titled, filed on Oct. 8, 2019, the disclosure of which is herein incorporated by reference in its entirety.

FIELD OF THE INVENTION

The present disclosure relates to oil spill response techniques and, more particularly, to a remotely controlled unmanned surface vehicle that has a thickness detection assembly with cameras to determine a thickness of a released substance present on the surface of a body of water.

BACKGROUND OF THE INVENTION

In the oil and gas industry, hydrocarbons are commonly accessed from wellbores drilled through one or more subterranean formations. The drilled wellbores provide a fluid flow path for hydrocarbons to be extracted from the subterranean formations to a processing facility. Some of these hydrocarbon resources are located under bodies of water, such as lakes, seas, bays, rivers and/or oceans, while others are located below onshore locations. To transfer hydrocarbons from such locations and to the processing facility, a pipeline and/or one or more different transport vessels (e.g., ship or tanker trucks) may be employed.

Additionally, hydrocarbons are often transferred from a production region to another region for consumption and/or processing into hydrocarbon-based products or from one hydrocarbon storage location to another. The transfer of such hydrocarbons often requires the use of one or more different transport vessels and routes over various bodies of water, such as lakes, seas, bays, rivers, and/or oceans. Leaks and/or spills of hydrocarbon substances into bodies of water can be problematic. Typically, the spilled hydrocarbons form a layer (e.g., an "oil slick") on the surface of the water, and various response techniques are employed to manage the oil slick. For instance, chemicals may be added to and mixed with the oil slick to break apart the hydrocarbon substances, or the oil slick may be ignited to burn off the oil. In some cases, the spilled hydrocarbons may be captured via a variety of mechanical recovery techniques.

Rapid and/or real-time remote detection and surveying of marine and freshwater oil spills is critical for efficient response planning and operations. The efficiency of oil spill response efforts is partly related to the ability to deploy recovery assets into the thickest regions of the spill for oil collection operations, such as mechanical recovery oil skimming. Current practices typically utilize remote sensing from satellite or aircraft to detect oil on the surface of the water. The data provided by such remote sensing platforms are typically delayed in time and, therefore, provide outdated or obsolete information by the time they reach oil spill response teams. Moreover, since oil on water can be highly mobile, remote sensing data provides only rudimentary oil thickness and expanse estimates and is often rendered inaccurate shortly after obtaining the data.

What is needed is a remote survey system that can be deployed quickly and efficiently to determine the areas of highest content of the released substance within an oil spill and transmit measured data in real-time. Such a remote survey system will be able to improve the effectiveness of subsequent oil spill response efforts.

SUMMARY OF THE INVENTION

An unmanned surface vehicle is disclosed and may include a body, a propulsion system coupled to the body to provide mobility to the body to traverse a surface of a waterbody, and a thickness detection assembly mounted to a hull of the body and including one or more thickness detection cameras positioned to obtain one or more images or videos of an air-oil-water interface on the surface of the waterbody, wherein a thickness of a released substance present on the surface of the waterbody is determined based on the one or more images or videos of the air-oil-water interface.

A remote survey system is also disclosed and may include an unmanned surface vehicle including a body, a propulsion system coupled to the body to provide mobility to the unmanned surface vehicle to traverse a surface of a waterbody, and a thickness detection assembly mounted to a hull of the body and including one or more thickness detection cameras. The remote survey system may further include a central computer system located at a command center and in wireless communication with the unmanned surface vehicle via a communication module, wherein the one or more thickness detection cameras are positioned to obtain one or more images or videos of an air-oil-water interface on the surface of the waterbody, and wherein a thickness of a released substance present on the surface of the waterbody is determined based on the one or more images or videos of the air-oil-water interface.

A method of surveying a released substance present on a surface of a waterbody is disclosed and may include the steps of deploying an unmanned surface vehicle from a deployment vessel, the unmanned surface vehicle including a body, a propulsion system coupled to the body, and a thickness detection assembly mounted to a hull of the body and including one or more thickness detection cameras in communication with the internal computer system. The method may further include the steps of operating the propulsion system to direct the unmanned surface vehicle toward the released substance present on the surface of the waterbody, obtaining one or more images or videos of an air-oil-water interface on the surface of the waterbody with the one or more thickness detection cameras, and determining a thickness of the released substance present on the surface of the waterbody based on the one or more images or videos of the air-oil-water interface.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 2 is a graphic illustration of the unmanned surface vehicle of FIGS. 1A-1B in example operation, according to one or more embodiments of the present disclosure.

FIGS. 3A and 3B are isometric and top views, respectively, of the thickness detection assembly of FIGS. 1A-1B and 2, according to one or more embodiments of the present disclosure.

DETAILED DESCRIPTION OF THE INVENTION

As used herein, and unless indicated otherwise, the term "substance" and "released substance" refers to any substance with a density less than the water in which the substance is released or otherwise present. The substance may include a chemical species such as organic materials, inorganic materials, and combinations thereof. The organic materials may include petrochemical materials, petroleum materials, and combinations thereof. Petroleum materials may include hydrocarbon oils, such as crude oil, vegetable oil, mineral oil, fuel oil and combinations thereof. In most examples provided herein, the released substance refers to an oil slick or oil spill present atop a body of water (or "waterbody"), but may alternatively refer to any of the above-referenced materials, without departing from the scope of the disclosure.

Figure 1A:
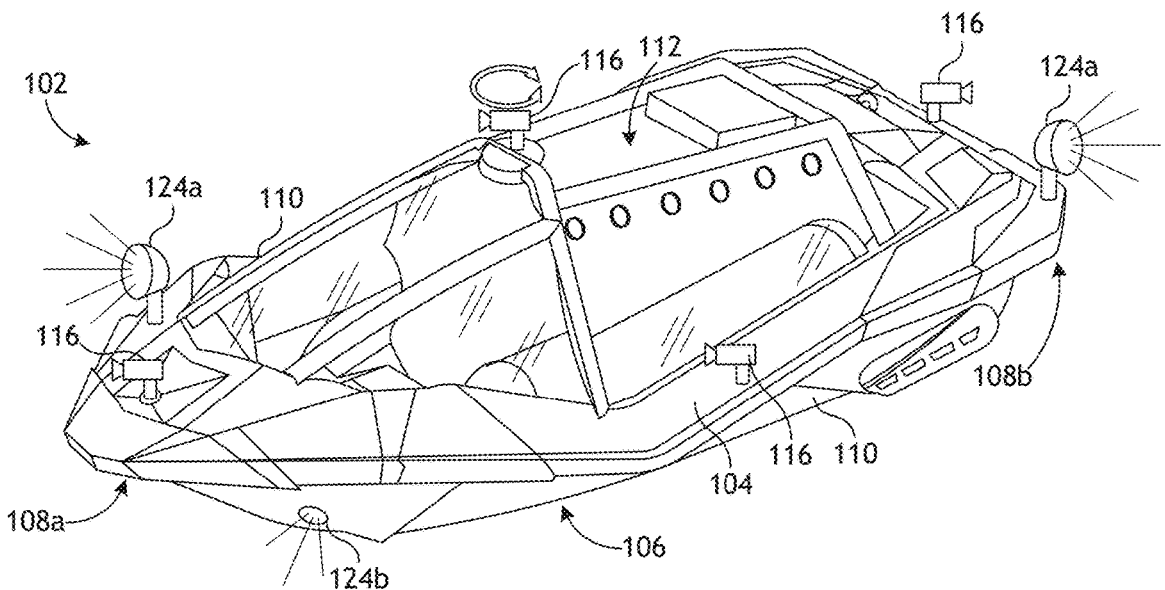
FIGS. 1A and 1B are isometric and side views, respectively, of an example unmanned surface vehicle that form part of a remote survey system in accordance with the principles of the present disclosure.
Figure 1B:
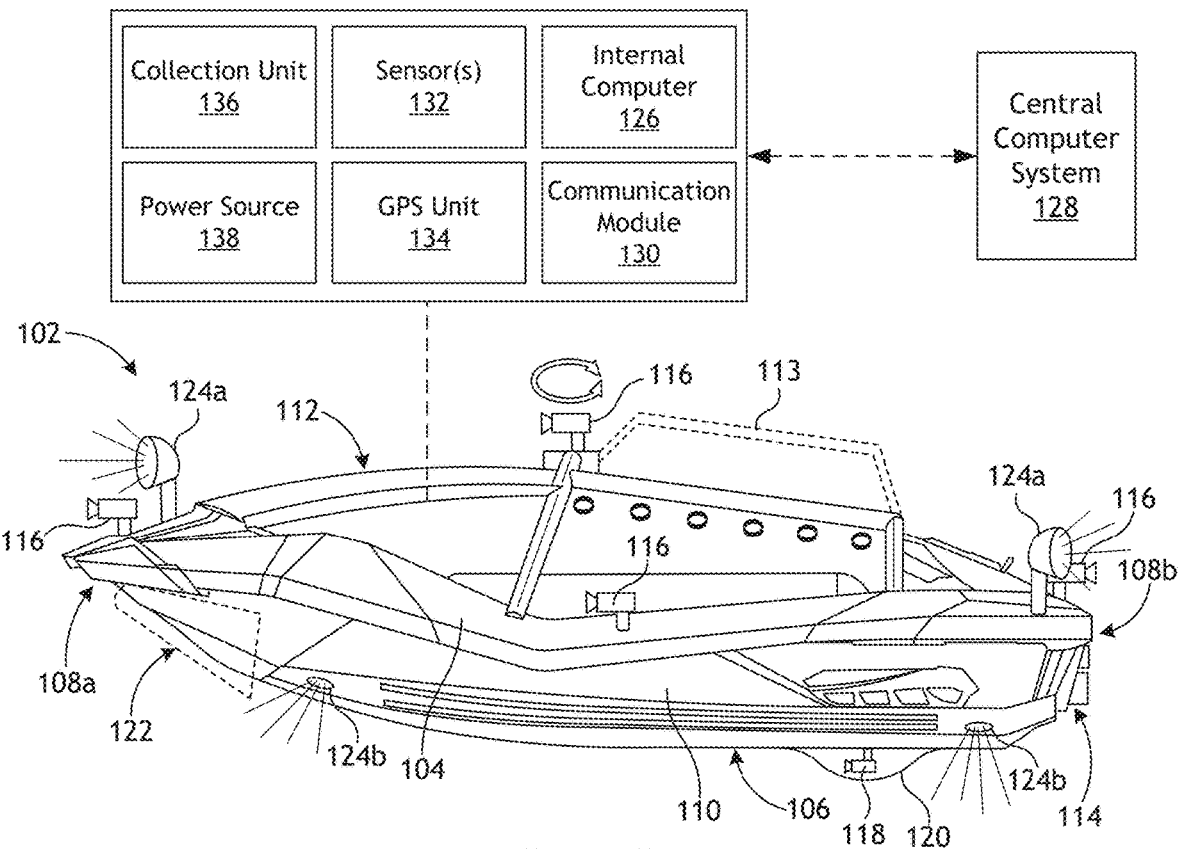

FIGS. 1A and 1B are isometric and side views, respectively, of an example unmanned surface vehicle 102 that may form part of a remote survey system in accordance with the principles of the present disclosure. The unmanned surface vehicle 102 (hereafter "USV 102") may comprise, for example, a powered water craft capable of traversing the surface of any body of water for the purpose of locating and surveying a released substance present on the surface of the water. In some embodiments, the USV 102 may be the same as or similar to a jet ski or another type of recreational or commercial water vehicle. In at least one embodiment, the USV 102 may comprise a retrofitted version of the Spark watercraft available from SEA-DOO®, but could alternatively comprise a retrofitted version of any other type of watercraft, or may otherwise be fabricated specifically for the purposes of the present disclosure.

As illustrated, the USV 102 may include a shell or body 104 that provides a bottom 106, a front 108a, a back 108b, and opposing sides 110. In some embodiments, the body 104 may include a removable top or lid 112 that provides access into the interior or hull of the body 104 for easy modification or adjustment of any components housed within the body 104. The lid 112 may be removably attached to the body 104 using, for example, one or more mechanical fasteners, a hinge and latch assembly, or any combination thereof. In some embodiments, the lid 112 and the body 104 may fit together as clamshell halves in which the lid 112 is bolted to the body 104 (i.e., the hull) around the perimeter. Once detached from the body 104, the lid 112 may be removed from the body 104 using a lift bar 113 (shown in dashed lines in FIG. 1B) or the like. Alternatively, or in addition thereto, the bar 113 may be used for grabbing and lifting the entire USV 102 to deploy the USV 102 into water or remove it from the water after use.

In one or more embodiments, the lid 112 may provide a sealed interface when it is properly secured to the body 104, which may help reduce or prevent the intrusion of water, debris, and/or substances into the interior of the body 104. Various component parts and electrical devices used to help operate the USV 102 may be secured within the hull of the body 104 and may be sealed therein when the lid 112 is properly secured to the body 104. Moreover, the removable lid 112 may be designed and otherwise configured to perform various tasks once removed, such as, but not limited to, surface oil sampling, water sampling at depth, or other suitable functions.

The USV 102 includes or otherwise incorporates a propulsion system 114 (partially visible in FIG. 1B) operable to provide mobility to the USV 102 to traverse the surface of a body of water. The propulsion system 114 may include, for example, a motor and one or more propulsion components operable by the motor and configured to maneuver the USV 102 in the water. In some embodiments, the propulsion system 114 may include one or more propellers or impellers included in a screw-type propeller system, an azimuth thruster system, or the like. In the illustrated embodiment, however, the propulsion system 114 comprises a water jet thruster with one or more discharge ports located at the back 108b of the body 104 to provide forward thrust to the USV 102. As will be appreciated, the propulsion system 114 may alternatively comprise any other propulsion mechanism suitable for driving (propelling) the USV 102 across (atop) the surface of water, without departing from the scope of the disclosure. In some embodiments, the propulsion system 114 may be able to move the USV 102 at a speed of up to 65 miles per hour or greater.

The USV 102 may include one or more cameras configured to obtain images, video, or data of the surrounding environment during operation. More specifically, the USV 102 may include one or more surface cameras 116 secured to the body 104 and configured to survey the surface of the water surrounding the USV 102. The surface cameras 116 may comprise a variety of types or designs of cameras suitable for obtaining images, video, or data. Suitable cameras types include, but are not limited to, high-definition (HD), infrared (IR), ultraviolet (UV), multi-spectral, polarimetric, or any combination thereof. Example IR cameras include visible, short, mid, and long wave versions.

In the illustrated embodiment, the surface cameras 116 are depicted as being mounted to the body 104 at the front 108a, the back 108b, and the sides 110 (only one shown on the sides 110) of the body 104, but could alternatively be mounted at any other suitable or desired location. Another surface camera 116 is mounted to the top of the USV 102 on the lid 112. Moreover, while five surface cameras 116 are depicted, more or less than five may be employed, without departing from the scope of the disclosure. In some embodiments, one or more of the surface cameras 116 (e.g., the surface camera 116 mounted to the lid 112) may be movable in at least three degrees of freedom, thus providing the ability to adjust the vertical angle in the z-direction and to adjust the circumferential angle in the x and y directions to provide 360° movement capability. In at least one embodiment, one or more of the surface cameras 116 may comprise a 360° virtual reality (VR) camera that enables a user to operate such cameras 116 by wearing VR goggles and manipulating the angular position of the cameras 116 using suitable controls. As a result, the user may be able to view and manipulate the viewing angle of the cameras 116 in real-time.

Referring specifically to FIG. 1B, the USV 102 may further include one or more subsurface cameras 118 (one shown) mounted to the body 104 on the bottom 106 and otherwise at locations where the subsurface camera(s) 118 will be submerged in the water when the USV 102 is in operation. The subsurface camera 118 may be configured to obtain images, video, or data of the subsurface environment surrounding the USV 102. In some embodiments, the subsurface camera 118 may be encapsulated within a capsule or chamber 120 made of a light transmitting material, meaning any material capable of transmitting light (or any other type of electromagnetic radiation) there through. The light transmitting material may comprise, for example, glass or a polymeric material (e.g., acrylic polymeric materials, polycarbonate polymeric materials, etc.).

The subsurface camera 118 may comprise any of the camera types mentioned herein for the surface cameras 116. Moreover, while only one subsurface camera 118 is depicted, more than one may be employed, without departing from the scope of the disclosure. Furthermore, similar to the surface cameras 116, the subsurface camera 118 may be movable in at least three degrees of freedom to enable the subsurface camera 118 to obtain images, video, or data at any angle. In at least one embodiment, the subsurface camera 118 may also comprise a 360° VR camera, thus enabling the user to view and manipulate the viewing angle of the subsurface camera 118 in real-time to view in every direction below the surface of the water.

Still referring to FIG. 1B, the USV 102 may further include a thickness detection assembly 122 (shown generally as a dashed box) mounted to or otherwise forming part of the hull of the body 104 at the front 108*a*. The thickness detection assembly 122 includes a camera and is positioned such that an image can be obtained of a substance (e.g., an oil slick) present on the surface of the water and extending a depth below an air-substance interface and into the water. Obtaining such images can help determine spatial distribution and/or thickness of the substance release. The thickness detection assembly 122 will be described in more detail below.

The USV 102 may further include one or more lights to illuminate the surrounding environment about the USV 102 and thereby allow dusk, dawn, and/or nighttime operations. More specifically, the USV 102 may include one or more surface lights 124*a* and one or more subsurface lights 124*b*. The surface lights 124*a* may provide light to the surrounding environment above the surface of the water, and the subsurface lights 124*b* may be configured to illuminate the water beneath the USV 102. Furthermore, one or more of the surface or subsurface lights 124*a,b* may be movable in at least three degrees of freedom to enable directing light beams in desired directions.

With reference again to FIG. 1B, the USV 102 may include various electronics or electrical components that help operate the USV 102 and perform various surveying and data collection functions. Such electrical systems and components may be largely stored and/or secured within compartments within the body 104 (e.g., the hull) and protected by the lid 112 when it is secured to the body 104. The USV 102, for example, may include an internal computer 126 programmed and otherwise configured to control operations of the USV 102 and its various component parts and functions. The internal computer 126 may include a memory and/or a microprocessor, and the memory may include one or more databases that store data relating to the USV 102 and its operation. In some embodiments, the memory may include non-transitory, computer-readable media such as a read-only memory (ROM), which may be PROM, EPROM, EEPROM, or the like. The microprocessor may be configured to process instructions included in the memory to operate the USV 102.

In some embodiments, the internal computer 126 may be in communication with a central computer system 128 via a communication module 130. The central computer system 128 may be located at a command center situated on a water borne vessel (e.g., a boat), an offshore platform, a land-based rig or facility, or any other location remote from the USV 102 during operation. A user may be able to communicate with and remotely control operations of the USV 102 from the command center using the central computer system 128. More specifically, commands may be issued by the user via the central computer system 128 and sent to the internal computer 126 via the communication module 128. Images, video, and data obtained by the USV 102 during operation may likewise be transmitted to the command center for processing and/or consideration via the same communication route.

In some embodiments, however, the internal computer 126 may be omitted and the various electronics or electrical components of the USV 102 may communicate directly with the central computer system 128 via the communication module 130, without departing from the scope of the disclosure. The communication module 130 may employ a variety of wireless communication technologies including, but not limited to, radio (e.g., Bluetooth, WiFi, etc.), cellular, microwave, satellite, or any combination thereof.

The USV 102 may include one or more sensors 132 configured to monitor the surrounding environment and obtain data that may help determine real-time conditions in the water. The sensor(s) 132 may be in wired or wireless communication with the internal computer 126 (or the communication module 130), and any data obtained by the sensor(s) 132 may be transmitted to the central computer system 128 for processing. In at least some embodiments, however, data obtained by the sensor(s) 132 may be processed by the internal computer 126 and results may be transmitted to the central computer system 128 for consideration by the user.

The sensor(s) 132 may be located at any suitable location on the USV 102 in order to obtain proper measurements of desired conditions or parameters. Some of the sensors 132 may be located on the exterior of the body 104, for example, but other sensors 132 may be located inside the body 104 and sealed therein with the lid 112. Example sensors 132 include, but are not limited to, a volatile organic compounds (VOC) sensor, a mass spectrometer, a gas chromatograph, a speedometer (e.g., current velocity of USV 102), a compass (e.g., direction of USV 102), a proximity sensor (e.g., collision avoidance), a wind speed/direction sensor, a temperature sensor (e.g., water, air, etc.), a fluorometer, an air quality sensor (e.g., to collect air quality data related to estimating burn efficiency if in situ burning occurs), and a depth sonar sensor.

The USV 102 may be characterized as a "modular" sensor platform. More specifically, the sensors 132 in the USV 102 may be changed and/or replaced with specific sensors designed for different applications. As a result, each time the USV 102 is deployed, the sensors 132 may be selected and installed based on what operations the USV 102 will undertake.

In some embodiments, the USV 102 may also include various types of microphones and sound generating devices. More specifically, the USV 102 may have one or more microphones to record sound in the vicinity of (or at a distance) the USV 102 during operation. Moreover, the USV 102 may include one or more sound generating devices (e.g., speakers) for delivering sound, sirens, audible alerts, etc.

The USV 102 may further include a global positioning system (GPS) unit 134. The GPS unit 134 may be in wired or wireless communication with the internal computer 126

(or the communication module 130) and configured to transmit real-time location signals of the USV 102 to the command center (e.g., the central computer system 128). Similar to the sensor(s) 132, the GPS unit 134 may be located at any convenient location on the USV 102; e.g., exterior or interior. The GPS unit 134 may operate continuously to provide the real-time location of the USV 102 during operation, which may prove advantageous in being able to correlate images, video, or sensor data obtained by the USV 102 to particular geographical locations. Consequently, this may help determine the exact location of a substance release (e.g., an oil slick) and where the thickest portions or operationally retrievable amounts of the substance are located within the substance release.

The USV 102 may further include a collection unit 136 configured to obtain samples of a released substance in the water. The collection unit 136 may be in communication with the internal computer 126 (or the central computer system 128) and may receive command signals that trigger operation of the collection unit 136 to obtain sample specimens. Samples may be taken at predetermined times, intermittent times, or as directed by the user. The collection unit 136 may comprise any device, mechanism, or system capable of collecting a sample of surface oil from the water and placing it in a container so that it can be transported back to the command center for analysis. In some embodiments, for example, the collection unit 136 may comprise a vacuum pump that may be operated to draw in a sample of the oil from the water. In other embodiments, the collection unit 136 may include a vessel (e.g., a beaker, a test tube, etc.) that can be filled with a sample of the oil and capped for transport back to the command center. In even further embodiments, the collection unit 136 may comprise a rotating belt (e.g., conveyor belt) extendable into the water and through the substance floating on the water. In such embodiments, the rotating belt can be made from material that the substance adheres to, such as an oleophilic material, and the belt moves through the substance to collect and/or concentrate the substance on the belt. A blade may then be used to remove the substance from the belt and place the extracted sample in a container for storage and/or transport. In at least one embodiment, the collection unit 136 may also include analysis equipment configured to test and analyze the collected samples and provide an output report that may be transmitted to the central computer system 128 for consideration by the user.

The USV 102 may further include a power source 138 used to power the USV 102 and the various component parts and systems of the USV 102. More particularly, the power source 138 may provide power to the internal computer 126, the communication module 130, the sensor(s) 132, the GPS unit 134, and the collection unit 136. In some embodiments, the power source 138 may also provide power the propulsion system 114 that provides mobility to the USV 102. The power source 138 may include, but is not limited to, a motor (e.g., a gasoline-powered engine), one or more batteries, one or more fuel cells, solar powered equipment, or any combination thereof. In embodiments, where the power source 138 comprises a motor, the motor may be configured to drive a generator and/or an alternator capable of powering the electronic components of the USV 102 and recharge any onboard batteries. In embodiments where the power source 138 comprises one or more batteries, the batteries may be rechargeable and capable of providing the USV 102 with an operating range of over 500 miles and/or an endurance range of over 12 hours of continuous operation.

FIG. 2 is a graphic illustration of the USV 102 in example operation, according to one or more embodiments of the present disclosure. As illustrated, the USV 102 is able to float atop a body of water 202 (alternately referred to as a "waterbody") and its propulsion system 114 (FIG. 1B) helps the USV 102 traverse the water and position itself adjacent to or within a released substance 204 (e.g., an oil slick). The USV 102 may be deployed into the water 202 via a variety of ways. In some embodiments, for example, the USV 102 may be stored and carried on a deployment vessel that offloads and positions the USV 102 in the water 102 when needed. In one or more embodiments, the deployment vessel may comprise an airborne vessel including, such as a manned or unmanned (autonomous) aircraft. Example airborne vessels include, but are not limited to, a winged airplane, a helicopter, a drone, a dirigible (e.g., an airship or blimp), or any combination thereof. In other embodiments, the deployment vessel may comprise a manned or unmanned waterborne vessel sufficiently sized to accommodate the USV 102. Example waterborne vessels include, but are not limited to, a boat, a ship, an underwater vehicle, an offshore platform, or any combination thereof.

In one or more embodiments, the remote survey system may further include an unmanned aerial vehicle 206 configured to provide aerial surveillance of the released substance 204 and the environment surrounding the USV 102. The unmanned aerial vehicle 206 (hereafter, the "UAV 206") may comprise, for example, a drone or small helicopter that may be remotely controlled by a user located at the command center. In some embodiments, as illustrated, the UAV 206 may be operatively coupled to the USV 102 with a tether line 208, which may provide data and power communication between the USV 102 and the UAV 206. Consequently, operation of the UAV 206 may be powered by the power source 138 (FIG. 1B) of the USV 102, which helps to increase the flight time of the UAV 206.

When not in use, the UAV 206 may be configured to be stowed on or in the USV 102. In some embodiments, for example, the tether line 208 may be retractable and thereby able to draw the UAV 206 to the USV 102 to be stowed on or within a hangar provided by the USV 102. In other embodiments, however, the tether line 208 may be omitted and the UAV 206 may operate using an onboard power source (e.g., a battery pack) and may be remotely or autonomously controlled to the USV 102 to be stowed on or within the hangar.

The UAV 206 may include one or more cameras 210 configured to obtain images, video, or data of the released substance 204 and the surrounding environment. The camera(s) 210 may be able to obtain real-time images, video, or data of the behavior of the released substance 204 as the USV 102 moves toward and/or through the body of water 202, and also obtain real-time images, video, or data of the sea-state conditions of the marine environment in the area of interest. The camera(s) 210 may comprise any of the camera types mentioned herein for the surface cameras 116. Accordingly, the UAV 206 may be capable of obtaining aerial footage and/or infrared images, which may be advantageous in locating and determining a perimeter (expanse) of the released substance 204, which may help determine the spatial distribution of the released substance 204. The released substance 204 may be identified by the HD and/or IR camera(s) 210 based on either visual cues from the HD camera 210 or infrared cues from the IR camera 210. It is known by those skilled in the art that oil slicks on a water surface tend to have different temperatures than the water surface itself, and these temperature differences are readily detectable via an infrared (IR) camera.

In some embodiments, the camera(s) 210 may include a polarized IR camera, which may obtain information on the emissivity of the released substance 204, in addition to temperature differences from standard IR. As will be appreciated, this allows detection of oil slicks based on emissivity differences between the oil and the surrounding water providing greater operational window (e.g., oil slicks undergo temperature equality with surrounding water at dawn and dusk). Moreover, a polarized IR camera may prove advantageous when dispersants are used for oil spill response. More specifically, some oil spill response protocols (e.g., Special Monitoring of Applied Response Technologies or "SMART") require personnel on boats to traverse through a dispersant-treated oil slick immediately after the dispersants are applied. This has safety concerns for the people on the boats, and a polarized IR (or regular IR) camera can determine when a dispersant-treated slick is removed from the surface. A polarized IR camera may also prove advantageous when undertaking in situ burning of the oil on the surface of the water. More specifically, oil spill response protocols require a real-time particulate monitor capable of detecting the small particulates emitted from the burn (e.g., ten microns in diameter or smaller), a global positioning system, and other equipment required for collecting and documenting the data. These instruments can be carried on the USV 102 and the UAV 206.

In some embodiments, one or more sensors may also be installed on the UAV 206. Example sensors include any of the sensors 132 described above with reference to FIG. 1B. Moreover, the UAV 206 may be operated and otherwise programmed to collect and record vertical profiles by having the UAV 206 change altitude while collecting data.

Any images, video, and/or data obtained by the cameras 210 and sensors may be transmitted to the USV 102 via the tether line 208, and the USV 102 may store, process, and/or re-transmit the information to the central computer system 128 via the communication module 130 (FIG. 1B). Alternatively, the images, video, or data obtained by the cameras 210 and sensors may be directly transmitted to the central computer system 128 via a transmitter (not shown) located onboard the UAV 206. In other embodiments, or in addition thereto, the images, video, or data obtained by the cameras 210 and sensors may be transmitted to multiple remote computers systems for display or analysis, without departing from the scope of the disclosure. The UAV 206 may further include one or more lights 212 to illuminate the released substance 204 and the surrounding environment and thereby allow dusk, dawn, and/or nighttime video surveillance.

In some embodiments, the USV 102 may include one or more nozzles 214 (one shown) mounted to the USV 102 and configured to discharge a jet of water 216. In at least one embodiment, the jet pump used in the propulsion system 114 (FIG. 1B) that propels the USV 102 may be used to generate the water pressure required to create the water jet 216. The nozzle 214 and the water jet 216 may be remotely operated by a user at the command center, and the nozzle 214 may be actuatable to move in three degrees of freedom. In other embodiments, however, the internal computer 126 (FIG. 1B) may be programmed to operate the nozzle autonomously based on a set of instructions. In some embodiments, the water jet 216 may be used to discharge water toward a fire 218 that may be burning on the released substance 204 or in another location.

In other embodiments, the water jet 216 may be used as a means of mechanical dispersion of the released substance 204. More specifically, the nozzle 214 may comprise one or more high-pressure nozzles configured to discharge water at an elevated velocity and pressure toward the released substance 204. In some cases, the high-pressure nozzle(s) may be fed with water from the jet pump used in the propulsion system 114 (FIG. 1B). In operation, the USV 102 may approach or traverse the released substance 204 while simultaneously discharging the water jet 216 from the nozzle(s) 214 at high-pressure, high-velocity down onto the released substance 204. The resulting high-pressure, high-velocity water jet(s) 216 impacts the underlying released substance 204, and the turbulence of the jet stream is powerful enough to break apart the oil slick into small, dispersed oil droplets that stay in the water column based on Stoke's law. Once dispersed, the smaller oil droplets can be naturally biodegraded in the water 202 over time.

In example operation, the USV 102 may be deployed and operated to approach the released substance 204. Upon approaching the released substance 204, or prior thereto, the UAV 206 may be deployed and use the camera(s) 210 to capture images, video, and/or data relative to the released substance 204. As will be appreciated, from the elevational vantage point of the UAV 206, any captured images, video, and/or data from the camera(s) 210 may help determine the spatial distribution of the released substance 204. The various cameras 116, 118 (FIGS. 1A-1B) included on the USV 102 may also be operated and otherwise used to capture additional images, video, and/or data relative to the released substance 204. Moreover, the sensor(s) 132 (FIG. 1B) may be operated to monitor the surrounding environment and obtain data that may help determine real-time conditions in the water 202 or of the released substance 204. Any images, video, and/or data obtained by the USV 102 may be transmitted to the central computer system 128 for processing, or the internal computer 126 (FIG. 1B) may alternatively process at least some of the images, video, and/or data. If desired or needed, the nozzle(s) 214 may be operated to douse a fire 218 or provide mechanical dispersion of the released substance 204, as generally described above.

In some embodiments, herding surfactants may be applied to the released substance 204 for recovery operations. In such embodiments, images or video of the released substance 204 may be obtained by the UAV 206 and the USV 102 may either autonomously or by remote operation travel along the perimeter of the released substance and spray the herding surfactants. Within a short amount of time (e.g., 10 minutes), the size of the released substance 204 will contract because the herding surfactants reduce the surface tension of the water 202 around the released substance 204. Once contracted, the released substance 204 is now thick enough to support combustion and the USV 102 may be configured or otherwise programmed to deliver one or more igniters to an up-wind location on the released substance 204 to start combustion. The nozzle(s) 214 may then be operated to control this burn, if necessary.

In managing an oil slick (e.g., the released substance 204), various factors must be considered as part of the assessment, including determining the spatial distribution and the thickness (or depth) of the released substance 204. The spatial distribution and thickness are useful in estimating the volume of hydrocarbons present in the oil slick. For example, conventional practice for marine oil spills is that 90% of the oil is located in 10% of the area as most of the slick is very thin. Determining the oil slick thickness is useful for oil spill response for many of the different response techniques. For example, mechanical recovery and in situ burning are more efficient on a thick oil slick. Also, dispersant dosage requirements change based on the slick thickness.

While the spatial distribution can typically be estimated from visual inspection, as mentioned above, conventional approaches do not adequately estimate the thickness of the oil slick. For example, conventional approaches typically utilize aircraft to determine the location of an oil slick for marine vessels. With this approach, a trained spotter or an instrument that detects an electromagnetic radiation signal from the slick is located in an airplane and in communication with response vessels. The challenge is that visual and electromagnetic radiation indicators are unable to distinguish oil thicker than about 0.1 mm.

According to embodiments disclosed herein, the thickness detection assembly 122, shown generally as a dashed box on the hull of the USV 102, may be operated to help determine the thickness of the released substance 204 at various locations as the USV 102 traverses the released substance 204. The propulsion system 114 may move the USV 102 through the released substance 204 on the body of water 202 to traverse an area of interest of the released substance 204 and determine regions wherein the released substance 204 is thickest for strategic deployment of oil spill response efforts. In one or more embodiments, the thickness may be determined in a continuous manner by generating video images in real time or a semi-continuous manner by generating a plurality of sequential images with the thickness detection assembly 122 as the USV 102 moves through the water 202 and the released substance 204 in an area of interest. In one or more other embodiments, the thickness may be determined in a discontinuous manner by generating images with the thickness detection assembly 122 for various discrete locations within an area of interest of the released substance 204. In one or more embodiments, the images or video may be generated using a combination of continuous, semi-continuous, and discontinuous techniques.

FIGS. 3A and 3B are isometric and top views, respectively, of one example of the thickness detection assembly 122, according to one or more embodiments of the present disclosure. As illustrated, the thickness detection assembly 122 (hereafter "the assembly 122") may include a housing 302 that may be coupled to or otherwise form part of the hull of the USV 102 (FIGS. 1A-1B and 2) at the front 108a (FIGS. 1A-1B). The housing 302 may provide opposing planar flanges 304a and 304b that extend laterally away from each other and are separated by a gap 306 defined therebetween. In some embodiments, the flanges 304a,b may comprise structural parts of the hull of the USV 102 at the front 108a, but may alternatively comprise separate component parts attached thereto.

The housing 302 may further form or provide a pocket 308, and the gap 306 between the opposing flanges 304a,b provides a window into the pocket 308. A rotatable cylinder 310 may be arranged within the pocket 308 and centered therein using one or more radial supports 312 (two shown). As illustrated, the radial supports 312 may extend from the inner wall of the pocket 308 and may be engageable with the outer radial surface of the cylinder 310. In some embodiments, the cylinder 310 may protrude radially outward and through the gap 306 a short distance. In such embodiments, the cylinder 310 may protrude past the plane formed by the opposing flanges 304a,b. In other embodiments, however, the cylinder 310 may be inset within the pocket 308 and not protrude through the gap 306, without departing from the scope of the disclosure.

The cylinder 310 may be made of a light transmitting material such as, but not limited to, glass or a polymeric material (e.g., acrylic polymeric materials, polycarbonate polymeric materials, etc.). One or more thickness detection cameras 314 (one shown) may be arranged within the cylinder 310 and configured to obtain images, video, or data of the surrounding environment through the cylinder 310 at the gap 306. While the thickness detection camera 314 is depicted as being situated at or near the back of the pocket 308 within the cylinder 310, the thickness detection camera 314 may alternatively be arranged near the front of the cylinder 310 and otherwise adjacent the gap 306, without departing from the scope of the disclosure.

The thickness detection camera 314 may comprise any of the camera types mentioned herein for the surface cameras 116 (FIGS. 1A-1B). Moreover, while only one thickness detection camera 314 is depicted within the cylinder 310, more than one may be employed, without departing from the scope of the disclosure. In some embodiments, the thickness detection camera 314 may be movable in at least three degrees of freedom to enable the thickness detection camera 314 to obtain images, video, or data at any angle within the cylinder 310. In at least one embodiment, the thickness detection camera 314 may comprise an HD visible camera that gives minimal pixel size to allow for accurate thickness estimates.

The thickness detection assembly 122 and, more particularly, the thickness detection camera 314, is positioned in the hull of the USV 102 (FIGS. 1A-1B and 2) such that the thickness detection camera 314 is able to obtain images of the air-oil-water interface where the released substance 204 (FIG. 2) is present on the water 202 (FIG. 2). In some embodiments, the thickness detection camera 314 may be a high definition camera and may be capable of generating images and/or video in real-time of the released substance 204 on the body of water 202 at the oil-water-air interface.

In some embodiments, the cylinder 310 may be rotatable within the pocket 308 and relative to the housing 302 and the thickness detection camera 314 in either angular direction (e.g., clockwise or counterclockwise). In such embodiments, one or more blades 316 (two shown) may extend from the opposing flanges 304a,b, respectively, and into the gap 306 to engage the outer surface of the cylinder 310 as it rotates. The blades 316 may operate to scrape off residual substance from the outer surface of the cylinder 310 as it rotates during operation. More specifically, as the USV 102 (FIGS. 1A-1B and 2) traverses the released substance 204 (FIG. 2), residual substance may build up on the outer surface of the cylinder 310, which may occlude the images or video obtained by the thickness detection camera 314. The blades 316 may be arranged to remove the residual substance as the cylinder 310 rotates, thus ensuring a clean transmitting surface through the cylinder 310 for the thickness detection camera 314 to capture images or video. In some embodiments, the blades 316 may be made of an elastomeric material, but could alternatively be made of a polymeric material or a metal. Furthermore, in some embodiments, the radial supports 312 may also be configured to scrape off residual substance from the outer surface of the cylinder 310 as it rotates during operation.

Figure 4:
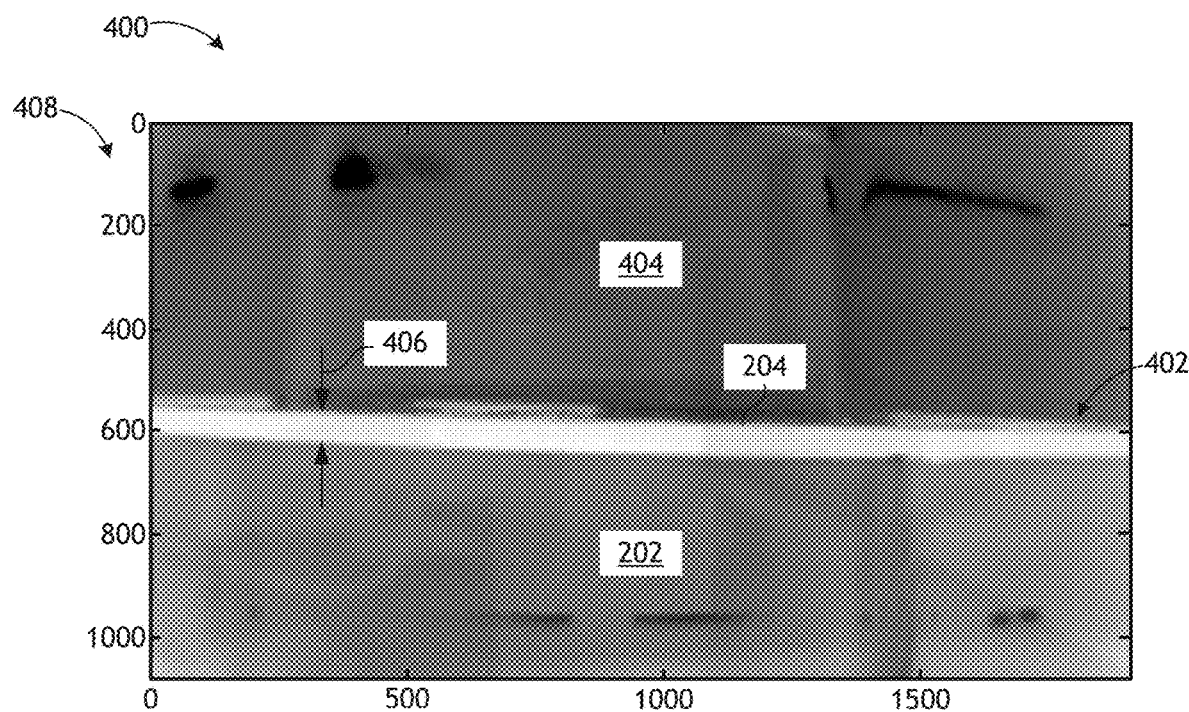
FIG. 4 is an example image of an oil-water-air interface that may be captured using the thickness detection assembly of FIGS. 3A-3B, according to one or more embodiments.

FIG. 4 is an example image 400 of an oil-water-air interface 402 that may be captured using the thickness detection assembly 122 of FIGS. 3A-3B, according to one or more embodiments. As illustrated, the oil-water-air interface 402 may include air 404, the water 202, and the released substance 204, all separated from each other based on density differences. The oil-water-air interface 402 may be observed through the wall of the cylinder 310 (FIGS. 3A-3B) as the USV 102 (FIGS. 1A-1B and 2) traverses the released substance 204. In some embodiments, the depth or thickness 406 of the released substance 204 at the oil-water-air interface 402 may be determined using a set measurement scale 408 provided on the cylinder 310 and readable by the thickness detection camera 314 (FIGS. 3A-3B). In other embodiments, the thickness 406 of the released substance 204 may be determined through pixilation of the thickness detection camera 314 and the central computer system 128 (FIG. 1B or 2), or the internal computer 126 (FIG. 1B), converts the digital images into thickness 406 measurements based on pixilation.

In operation, the thickness 406 of the released substance 204 may be determined at various locations throughout the expanse of the released substance 204, and the exact location of such measurements may be correlated using the GPS unit 134 (FIG. 1B). The result is a real-time map of the released substance 204 that provides thicknesses 406 and location of the released substance 204 corresponding to exact latitude and longitude. This data may be transmitted to the command center for tactical oil spill response decision making.

In some embodiments, operation of the USV 102 (FIGS. 1A-1B and 2) may be autonomous and based on autopilot instructions directed through the GPS unit 134 (FIG. 1B). Moreover, the autopilot function may be reprogrammable in real-time in the event the released substance 204 (FIG. 2) moves, thus redirecting the USV 102 to where the released substance 204 has moved. As the USV 102 operates, oil thickness estimation may also be automated based on a set of instructions followed by the internal computer 126 (FIG. 1B).

As an example, a computer system may be utilized and configured to implement one or more embodiments of the present disclosure. The computer system may include a processor, a memory in communication with the processor, and a set of instructions stored on the memory and accessible by the processor, wherein the set of instructions, when executed, are configured to receive the transmitted signal from an unmanned surface vehicle (e.g., the USV 102); determine the thickness of a released substance based on the transmitted signal; and provide a visible indication of the thickness of the substance based on the determination. At predetermined times or otherwise when manually instructed, the thickness of the substance, its GPS location, and time will be captured by the unmanned surface vehicle and sent to the computer system. This data may be received and processed with the computer system to obtain a real-time (or near real-time) map of the thickness of the substance, and the map may be transmitted to interested parties for consideration. In some embodiments, the computer system may include an automated thickness algorithm configured to generate a thickness number that may provide interested users with the general thickness of the substance.

In one or more embodiments, the unmanned surface vehicle transmits an image signal to a command center, the command center receives the signal and extracts a thickness determination from the image signal and displays the thickness determination on a monitor. In one or more embodiments, a remote survey system comprises a command center; one or more unmanned surface vehicles directly or indirectly in communication with the command center and optionally one or more deployment vessels used to deploy the one or more unmanned surface vehicles for use in the water and also directly or indirectly in communication with the command center. One or more of the unmanned surface vehicle and deployment device may include a propulsion system having one or more propulsion components, as discussed herein. In one or more embodiments, one or more propulsion components of the propulsion system may be configured to be controlled via remote control communications.

The unmanned surface vehicle may include a communication module configured to communicate signals directly or indirectly to the command center. In one or more embodiments, the communication module may be configured to transmit to the command center via hardware selected from wireless communication hardware, cellular communication hardware, and combinations thereof. The unmanned surface vehicle also includes a detection component configured to generate one or more images or video of the released substance from a thickness detection assembly and any additional cameras. The detection component may additionally be configured to determine the thickness of the released substance from the images or video from the thickness detection assembly.

In one or more embodiments, the determination of the thickness of the released substance based on the transmitted signal may comprise a set of instructions that when executed are configured to: display an image or real time video generated by the thickness detection assembly on a monitor to visually determine the relative thickness of the released substance based on comparing a plurality of images from the thickness detection assembly. The image comparison may be performed by an operator or computer and regions of thickest substance or other operationally retrievable amounts of the substance input into the computer system. In one or more embodiments, an operator may view real-time video images generated from the unmanned surface vehicle and determine relative thicknesses between regions being surveyed in the area of interest. The data may be input and stored in a computer system. The data may be displayed to the operator on a digital display, for example, in the format of a dashboard. In other embodiments, the dashboard may be in a non-electronic form. The dashboard may also include one or more predetermined paths to be traversed by a thickness detection device. In one or more embodiments, the positioning of the unmanned surface vehicle may be displayed concurrently with the real-time video images and configured such that the operator may mark or otherwise input into the dashboard the relative thicknesses for various regions being surveyed. The regions of thickest substance or other operationally retrievable amounts of the substance may be identified for the deployment of a response team. If more than one unmanned surface vehicles are utilized, additional operators may be provided for each of the additional apparatuses.

In one or more additional embodiments, the determination of the thickness of the released substance may comprise a set of instructions that when executed are configured to apply one or more algorithms to discretely generate images or images from video generated from a thickness detection assembly to determine the thickness of the released substance in the image. In one or more embodiments, the set of instructions may additionally be configured to compare thicknesses of different locations from a plurality of images and provide the regions of thickest substance or other operationally retrievable amounts of the substance and the associated locations. The thickness determinations of the algorithm may be qualitative or quantitative.

In one or more embodiments, the command center may include central computer system that has a set of instructions stored on the memory and accessible by the processor, wherein the set of instructions, when executed, are configured to provide one or more of a visual indication and audible notification associated with thicker amounts of the substance. The visible and/or audible notification may be based on a predetermined thickness threshold value. In one or more embodiments, the command center may also include a set of instructions stored on the memory and accessible by the processor, wherein the set of instructions, when executed, are configured to store the thickness of the substance at the specific location.

Figure 5:
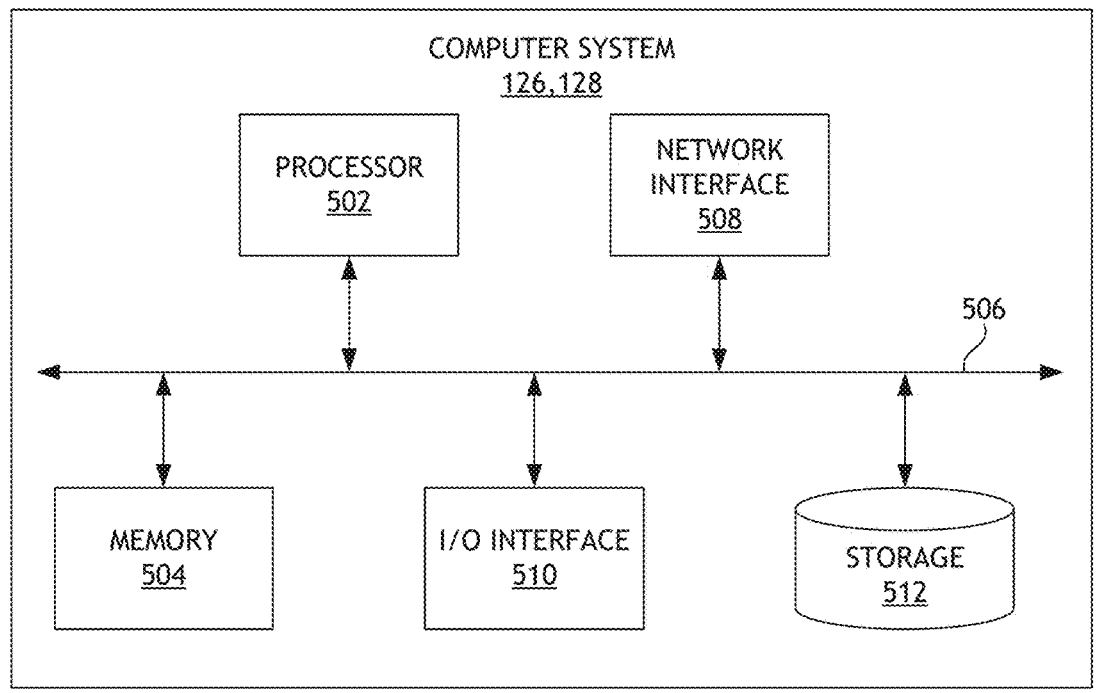
FIG. 5 illustrates an example embodiment of the internal or central computer systems of FIG. 1B.

FIG. 5 illustrates an example embodiment of the internal computer system 126 or the central computer system 128 of FIG. 1B. As shown, the computer system(s) 126, 128 include one or more processors 502, which can control the operation of the computer system(s) 126, 128. "Processors" are also referred to herein as "controllers." The processor(s) 502 can include any type of microprocessor or central processing unit (CPU), including programmable general-purpose or special-purpose microprocessors and/or any one of a variety of proprietary or commercially available single or multi-processor systems. The computer system(s) 126, 128 can also include one or more memories 504, which can provide temporary storage for code to be executed by the processor(s) 502 or for data acquired from one or more users, storage devices, and/or databases. The memory 504 can include read-only memory (ROM), flash memory, one or more varieties of random access memory (RAM) (e.g., static RAM (SRAM), dynamic RAM (DRAM), or synchronous DRAM (SDRAM)), and/or a combination of memory technologies.

The various elements of the computer system(s) 126, 128 can be coupled to a bus system 506. The illustrated bus system 506 is an abstraction that represents any one or more separate physical busses, communication lines/interfaces, and/or multi-drop or point-to-point connections, connected by appropriate bridges, adapters, and/or controllers. The computer system(s) 126, 128 can also include one or more network interface(s) 508, one or more input/output (IO) interface(s) 510, and one or more storage device(s) 512.

The network interface(s) 508 can enable the computer system(s) 126, 128 to communicate with remote devices, e.g., other computer systems, over a network, and can be, for non-limiting example, remote desktop connection interfaces, Ethernet adapters, and/or other local area network (LAN) adapters. The IO interface(s) 510 can include one or more interface components to connect the computer system(s) 126, 128 with other electronic equipment. For non-limiting example, the IO interface(s) 510 can include high-speed data ports, such as universal serial bus (USB) ports, 1394 ports, Wi-Fi, Bluetooth, etc. Additionally, the computer system(s) 126, 128 can be accessible to a human user, and thus the IO interface(s) 510 can include displays, speakers, keyboards, pointing devices, and/or various other video, audio, or alphanumeric interfaces. The storage device(s) 512 can include any conventional medium for storing data in a non-volatile and/or non-transient manner. The storage device(s) 512 can thus hold data and/or instructions in a persistent state, i.e., the value(s) are retained despite interruption of power to the computer system(s) 126, 128. The storage device(s) 512 can include one or more hard disk drives, flash drives, USB drives, optical drives, various media cards, diskettes, compact discs, and/or any combination thereof and can be directly connected to the computer system(s) 126, 128 or remotely connected thereto, such as over a network. In an exemplary embodiment, the storage device(s) 512 can include a tangible or non-transitory computer readable medium configured to store data, e.g., a hard disk drive, a flash drive, a USB drive, an optical drive, a media card, a diskette, a compact disc, etc.

The elements illustrated in FIG. 5 can be some or all of the elements of a single physical machine. In addition, not all of the illustrated elements need to be located on or in the same physical machine. Exemplary computer systems include conventional desktop computers, workstations, minicomputers, laptop computers, tablet computers, personal digital assistants (PDAs), mobile phones, and the like.

The computer system(s) 126, 128 can include a web browser for retrieving web pages or other markup language streams, presenting those pages and/or streams (visually, aurally, or otherwise), executing scripts, controls and other code on those pages/streams, accepting user input with respect to those pages/streams (e.g., for purposes of completing input fields), issuing HyperText Transfer Protocol (HTTP) requests with respect to those pages/streams or otherwise (e.g., for submitting to a server information from the completed input fields), and so forth. The web pages or other markup language can be in HyperText Markup Language (HTML) or other conventional forms, including embedded Extensible Markup Language (XML), scripts, controls, and so forth. The computer system(s) 126, 128 can also include a web server for generating and/or delivering the web pages to client computer systems.

In an exemplary embodiment, the computer system(s) 126, 128 can be provided as a single unit, e.g., as a single server, as a single tower, contained within a single housing, etc. The single unit can be modular such that various aspects thereof can be swapped in and out as needed for, e.g., upgrade, replacement, maintenance, etc., without interrupting functionality of any other aspects of the system. The single unit can thus also be scalable with the ability to be added to as additional modules and/or additional functionality of existing modules are desired and/or improved upon.

The computer system(s) 126, 128 can also include any of a variety of other software and/or hardware components, including by way of non-limiting example, operating systems and database management systems. Although an exemplary computer system is depicted and described herein, it will be appreciated that this is for the sake of generality and convenience. In other embodiments, the computer system may differ in architecture and operation from that shown and described here.

The present disclosure provides, among others, the following embodiments, each of which may be considered as alternatively including any of the alternate embodiments:

Clause 1. An unmanned surface vehicle includes a body, a propulsion system coupled to the body to provide mobility to the body to traverse a surface of a waterbody, and a thickness detection assembly mounted to a hull of the body and including one or more thickness detection cameras positioned to obtain one or more images or videos of an air-oil-water interface on the surface of the waterbody, wherein a thickness of a released substance present on the surface of the waterbody is determined based on the one or more images or videos of the air-oil-water interface.

Clause 2. The unmanned surface vehicle of Clause 1, further comprising one or more cameras secured to the body to survey at least one of the surface of the waterbody and below the surface of the waterbody.

Clause 3. The unmanned surface vehicle of Clause 2, wherein the one or more cameras is selected from the group consisting of a high-definition camera, an infrared camera, an ultraviolet camera, a multi-spectral camera, a 360° virtual reality camera, a polarimetric camera, and any combination thereof.

Clause 4. The unmanned surface vehicle of any of the preceding Clauses, further comprising one or more sensors arranged on the body to monitor a surrounding environment, the one or more sensors being selected from the group consisting of a volatile organic compounds sensor, a mass spectrometer, a gas chromatograph, a speedometer, a compass, a proximity sensor, a wind speed/direction sensor, a temperature sensor, a fluorometer, an air quality sensor, and a depth sonar sensor.

Clause 5. The unmanned surface vehicle of any of the preceding Clauses, further comprising a global positioning system unit arranged on the body and in communication with a computer system to provide real-time location of the unmanned surface vehicle.

Clause 6. The unmanned surface vehicle of any of the preceding Clauses, further comprising a collection unit arranged on the body to obtain samples of the released substance.

Clause 7. The unmanned surface vehicle of any of the preceding Clauses, further comprising an unmanned aerial vehicle tethered to the body.

Clause 8. The unmanned surface vehicle of Clause 7, wherein the unmanned aerial vehicle includes one or more cameras to survey the surface of the waterbody.

Clause 9. The unmanned surface vehicle of any of the preceding Clauses, further comprising one or more nozzles mounted to the body for discharging a jet of water.

Clause 10. The unmanned surface vehicle of any of the preceding Clauses, wherein the thickness detection assembly comprises a housing having opposing flanges extending laterally away from each other and separated by a gap, a pocket defined by the housing, and a cylinder made of a light transmitting material and arranged within the pocket, wherein the one or more thickness detection cameras are arranged within the cylinder to obtain the one or more images or videos of the air-oil-water interface through the light transmitting material at the gap.

Clause 11. The unmanned surface vehicle of Clause 10, wherein the cylinder is rotatable relative to the housing and the one or more thickness detection cameras, the thickness detection assembly further comprising: one or more blades extending from the opposing flanges and into the gap to engage an outer surface of the cylinder as it rotates.

Clause 12. A remote survey system includes an unmanned surface vehicle including a body, a propulsion system coupled to the body to provide mobility to the unmanned surface vehicle to traverse a surface of a waterbody, and a thickness detection assembly mounted to a hull of the body and including one or more thickness detection cameras. The remote survey system further includes a central computer system located at a command center and in wireless communication with the unmanned surface vehicle via a communication module, wherein the one or more thickness detection cameras are positioned to obtain one or more images or videos of an air-oil-water interface on the surface of the waterbody, and wherein a thickness of a released substance present on the surface of the waterbody is determined based on the one or more images or videos of the air-oil-water interface.

Clause 13. The remote survey system of Clause 12, wherein the command center is located on at least one of a water borne vessel, an offshore platform, a land-based rig or facility, and any combination thereof.

Clause 14. The remote survey system of Clause 12 or Clause 13, further comprising one or more cameras secured to the body to survey at least one of the surface of the waterbody and below the surface of the waterbody, the one or more cameras being selected from the group consisting of a high-definition camera, an infrared camera, an ultraviolet camera, a multi-spectral camera, a 360° virtual reality camera, and any combination thereof.

Clause 15. The remote survey system of any of Clauses 12 to 14, further comprising one or more sensors arranged on the body to monitor a surrounding environment, the one or more sensors being selected from the group consisting of a volatile organic compounds sensor, a mass spectrometer, a gas chromatograph, a speedometer, a compass, a proximity sensor, a wind speed and direction sensor, a temperature sensor, a fluorometer, an air quality sensor, and a depth sonar sensor.

Clause 16. The remote survey system of any of Clauses 12 to 15, further comprising a global positioning system unit arranged on the body and in communication with the central computer to provide real-time location of the unmanned surface vehicle.

Clause 17. The remote survey system of any of Clauses 12 to 16, further comprising a collection unit arranged on the body to obtain samples of the released substance.

Clause 18. The remote survey system of any of Clauses 12 to 17, further comprising an unmanned aerial vehicle tethered to the unmanned surface vehicle.

Clause 19. The remote survey system of Clause 18, wherein the unmanned aerial vehicle includes one or more cameras in communication with the central computer system to survey the surface of the waterbody.

Clause 20. The remote survey system of any of Clauses 12 to 19, wherein the thickness detection assembly comprises a housing having opposing flanges extending laterally away from each other and separated by a gap, a pocket defined by the housing, and a cylinder made of a light transmitting material and arranged within the pocket, wherein the one or more thickness detection cameras are arranged within the cylinder to obtain the one or more images or videos through the light transmitting material at the gap.

Clause 21. The remote survey system of Clause 20, wherein the cylinder is rotatable relative to the housing and the one or more thickness detection cameras, and wherein the thickness detection assembly further comprises one or more blades extending from the opposing flanges and into the gap to engage an outer surface of the cylinder as it rotates.

Clause 22. A method of surveying a released substance present on a surface of a waterbody, comprising deploying an unmanned surface vehicle from a deployment vessel, the unmanned surface vehicle including a body, a propulsion system coupled to the body, and a thickness detection assembly mounted to a hull of the body and including one or more thickness detection cameras in communication with the internal computer system. The method further including operating the propulsion system to direct the unmanned surface vehicle toward the released substance present on the surface of the waterbody, obtaining one or more images or videos of an air-oil-water interface on the surface of the waterbody with the one or more thickness detection cameras, and determining a thickness of the released substance present on the surface of the waterbody based on the one or more images or videos of the air-oil-water interface.

Clause 23. The method of Clause 22, further comprising communicating with the unmanned surface vehicle with a central computer system situated at a command center located on at least one of a water borne vessel, an offshore platform, a land-based rig or facility, and any combination thereof.

Clause 24. The method of Clause 23, further comprising providing real-time location of the unmanned surface vehicle to the central computer using a global positioning system unit arranged on the body, and correlating the thickness of the released substance present on the surface of the waterbody with the real-time location and thereby generating a real-time map of the released substance that provides the thicknesses and the location of the released substance.

Clause 25. The method of any of Clauses 22 to 24, further comprising surveying at least one of the surface of the waterbody and below the surface of the waterbody with one or more cameras secured to the body.

Clause 26. The method of Clause 25, wherein the one or more cameras include at least one 360° virtual reality camera, the method further comprising receiving real-time video from the at least one 360° virtual reality camera at a set of virtual reality goggles wearable by an operator, and operating the unmanned surface vehicle in real-time based on the real-time video received at the set of virtual reality goggles.

Clause 27. The method of any of Clauses 22 to 26, further comprising deploying an unmanned aerial vehicle from the unmanned surface vehicle, surveying the surface of the waterbody with one or more cameras coupled to the unmanned aerial vehicle, and determining a spatial distribution of the released substance based on images or video obtained by the one or more cameras coupled to the unmanned aerial vehicle.

Clause 28. The method of Clause 27, wherein the one or more cameras include a polarized infrared (IR) camera and surveying the surface of the waterbody with the one or more cameras further comprises obtaining data related to the released substance with the polarized IR, and obtaining data regarding volatile organic compounds and particulate matter in the released substance with one or more sensors coupled to the unmanned aerial vehicle.

Clause 29. The method of any of Clauses 22 to 28, wherein the thickness detection assembly includes a housing having opposing flanges extending laterally away from each other and separated by a gap, a pocket defined by the housing, and a cylinder made of a light transmitting material and arranged within the pocket, the method further comprising obtaining the one or more images or videos through the light transmitting material at the gap with the one or more thickness detection cameras arranged within the cylinder.

Clause 30. The method of Clause 29, wherein the thickness detection assembly further includes one or more blades extending from the opposing flanges and into the gap, the method further comprising rotating the cylinder relative to the housing and the one or more thickness detection cameras, engaging an outer surface of the cylinder as it rotates with the one or more blades, and scraping off residual released substance from the outer surface of the cylinder with the one or more blades as the cylinder rotates.

Clause 31. The method of any of Clauses 22 to 30, further comprising discharging a jet of water from one or more nozzles mounted to the body.

Clause 32. The method of Clause 31, further comprising discharging the jet of water to douse a fire present on the released substance, or mechanically disperse the released substance.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. An unmanned surface vehicle, comprising:
   a body;
   a propulsion system coupled to the body to provide mobility to the body to traverse a surface of a waterbody; and
   a thickness detection assembly mounted to a hull of the body and including one or more thickness detection cameras positioned to obtain one or more images or videos of an air-oil-water interface on the surface of the waterbody, wherein a thickness of a released substance present on the surface of the waterbody is determined based on the one or more images or videos of the air-oil-water interface.

2. The unmanned surface vehicle of claim 1, further comprising one or more cameras secured to the body to survey at least one of the surface of the waterbody and below the surface of the waterbody.

3. The unmanned surface vehicle of claim 2, wherein the one or more cameras is selected from the group consisting of a high-definition camera, an infrared camera, an ultraviolet camera, a multi-spectral camera, a 360° virtual reality camera, a polarimetric camera, and any combination thereof.

4. The unmanned surface vehicle of claim 1, further comprising one or more sensors arranged on the body to monitor a surrounding environment, the one or more sensors being selected from the group consisting of a volatile organic compounds sensor, a mass spectrometer, a gas chromatograph, a speedometer, a compass, a proximity sensor, a wind speed/direction sensor, a temperature sensor, a fluorometer, an air quality sensor, and a depth sonar sensor.

5. The unmanned surface vehicle of claim 1, further comprising a global positioning system unit arranged on the body and in communication with a computer system to provide real-time location of the unmanned surface vehicle.

6. The unmanned surface vehicle of claim 1, further comprising a collection unit arranged on the body to obtain samples of the released substance.

7. The unmanned surface vehicle of claim 1, further comprising an unmanned aerial vehicle tethered to the body.

8. The unmanned surface vehicle of claim 7, wherein the unmanned aerial vehicle includes one or more cameras to survey the surface of the waterbody.

9. The unmanned surface vehicle of claim 1, further comprising one or more nozzles mounted to the body for discharging a jet of water.

10. The unmanned surface vehicle of claim 1, wherein the thickness detection assembly comprises:
a housing having opposing flanges extending laterally away from each other and separated by a gap;
a pocket defined by the housing; and
a cylinder made of a light transmitting material and arranged within the pocket,
wherein the one or more thickness detection cameras are arranged within the cylinder to obtain the one or more images or videos of the air-oil-water interface through the light transmitting material at the gap.

11. The unmanned surface vehicle of claim 10, wherein the cylinder is rotatable relative to the housing and the one or more thickness detection cameras, the thickness detection assembly further comprising:
one or more blades extending from the opposing flanges and into the gap to engage an outer surface of the cylinder as it rotates.

12. A remote survey system, comprising:
an unmanned surface vehicle including:
a body;
a propulsion system coupled to the body to provide mobility to the unmanned surface vehicle to traverse a surface of a waterbody; and
a thickness detection assembly mounted to a hull of the body and including one or more thickness detection cameras; and
a central computer system located at a command center and in wireless communication with the unmanned surface vehicle via a communication module,
wherein the one or more thickness detection cameras are positioned to obtain one or more images or videos of an air-oil-water interface on the surface of the waterbody, and
wherein a thickness of a released substance present on the surface of the waterbody is determined based on the one or more images or videos of the air-oil-water interface.

13. The remote survey system of claim 12, wherein the command center is located on at least one of a water borne vessel, an offshore platform, a land-based rig or facility, and any combination thereof.

14. The remote survey system of claim 12, further comprising one or more cameras secured to the body to survey at least one of the surface of the waterbody and below the surface of the waterbody, the one or more cameras being selected from the group consisting of a high-definition camera, an infrared camera, an ultraviolet camera, a multi-spectral camera, a 360° virtual reality camera, and any combination thereof.

15. The remote survey system of claim 12, further comprising one or more sensors arranged on the body to monitor a surrounding environment, the one or more sensors being selected from the group consisting of a volatile organic compounds sensor, a mass spectrometer, a gas chromatograph, a speedometer, a compass, a proximity sensor, a wind speed and direction sensor, a temperature sensor, a fluorometer, an air quality sensor, and a depth sonar sensor.

16. The remote survey system of claim 12, further comprising a global positioning system unit arranged on the body and in communication with the central computer to provide real-time location of the unmanned surface vehicle.

17. The remote survey system of claim 12, further comprising a collection unit arranged on the body to obtain samples of the released substance.

18. The remote survey system of claim 12, further comprising an unmanned aerial vehicle tethered to the unmanned surface vehicle.

19. The remote survey system of claim 18, wherein the unmanned aerial vehicle includes one or more cameras in communication with the central computer system to survey the surface of the waterbody.

20. The remote survey system of claim 12, wherein the thickness detection assembly comprises:
a housing having opposing flanges extending laterally away from each other and separated by a gap;
a pocket defined by the housing; and
a cylinder made of a light transmitting material and arranged within the pocket,
wherein the one or more thickness detection cameras are arranged within the cylinder to obtain the one or more images or videos through the light transmitting material at the gap.

21. The remote survey system of claim 20, wherein the cylinder is rotatable relative to the housing and the one or more thickness detection cameras, and wherein the thickness detection assembly further comprises one or more blades extending from the opposing flanges and into the gap to engage an outer surface of the cylinder as it rotates.

22. A method of surveying a released substance present on a surface of a waterbody, comprising:
deploying an unmanned surface vehicle from a deployment vessel, the unmanned surface vehicle including:
a body;
a propulsion system coupled to the body; and a thickness detection assembly mounted to a hull of the body and including one or more thickness detection cameras in communication with the internal computer system; and operating the propulsion system to direct the unmanned surface vehicle toward the released substance present on the surface of the waterbody;

obtaining one or more images or videos of an air-oil-water interface on the surface of the waterbody with the one or more thickness detection cameras; and determining a thickness of the released substance present on the surface of the waterbody based on the one or more images or videos of the air-oil-water interface.

23. The method of claim 22, further comprising communicating with the unmanned surface vehicle with a central computer system situated at a command center located on at least one of a water borne vessel, an offshore platform, a land-based rig or facility, and any combination thereof.

24. The method of claim 23, further comprising:

providing real-time location of the unmanned surface vehicle to the central computer using a global positioning system unit arranged on the body; and correlating the thickness of the released substance present on the surface of the waterbody with the real-time location and thereby generating a real-time map of the released substance that provides the thicknesses and the location of the released substance.

25. The method of claim 22, further comprising surveying at least one of the surface of the waterbody and below the surface of the waterbody with one or more cameras secured to the body.

* * * * *